United States Patent [19]

Tu

[11] 4,154,978
[45] May 15, 1979

[54] SELF-CONTAINED BIDIRECTIONAL AMPLIFYING REPEATER

[75] Inventor: Ju Ching Tu, Canoga Park, Calif.

[73] Assignee: Operating Systems, Inc., Woodland Hills, Calif.

[21] Appl. No.: 858,734

[22] Filed: Dec. 8, 1977

[51] Int. Cl.² ............................................. H04L 5/16
[52] U.S. Cl. ............................... 178/71 R; 178/58 A; 307/242
[58] Field of Search ........... 340/346; 178/71 R, 58 R, 178/58 A; 307/242, 254; 328/97

[56] References Cited

U.S. PATENT DOCUMENTS 3,967,059  6/1976  Moore et al. ..................... 178/58 A

OTHER PUBLICATIONS

Johnston, "Redriver for Two-Way Bus", IBM Tech. Discl. Bull., vol. 18, No. 3, Aug. 1975, pp. 663-664.

Primary Examiner—Thomas A. Robinson
Attorney, Agent, or Firm—Charlton M. Lewis

[57] ABSTRACT

Bidirectional repeater circuits for bus-lines and the like are described which, when in idle condition, are capable of promptly transmitting binary data signals in either direction with amplification to restore wave form. A control signal is derived from each data signal during its transmission without imposing any time delay upon the transmission, and is used to disable temporarily signal transmission in the other direction. Thus, the repeater is self-contained in the sense of requiring no external control signal for controlling the direction of transmission. Capability for selectively disabling data transmission in both directions under external control can readily be incorporated in the circuits of the invention.

7 Claims, 8 Drawing Figures

SELF-CONTAINED BIDIRECTIONAL AMPLIFYING REPEATER

BACKGROUND OF THE INVENTION

This invention concerns electronic repeaters for transmission of binary signals in either direction between sections of a bus-line or the like, with suitable amplification for restoring the desired waveform of signals that have become distorted during previous transmission.

Such bidirectional line repeaters typically handle transmission in the two directions by essentially distinct transmission circuits which are connected in parallel between terminals of the respective line sections. In order to avoid instability due to positive gain in the resulting loop circuit, it is usual to provide some form of electronic switching means for selectively enabling only one circuit at a time, according to the direction in which data signals are to be transmitted.

Selection of the transmission circuit to be enabled in such repeaters is ordinarily controlled by externally developed control signals, which may be produced, for example, in the same equipment units from which the data signals are received. That method of avoiding instability has the obvious disadvantages that hardware must be provided for generating suitable external control signals, and that additional control lines are required for delivering those signals to each repeater. Also, if the line repeater is used in a computer circuit, additional program instructions may be needed to control the transmission.

A primary purpose of the present invention is to provide a simple and economical amplifying repeater circuit which is self-contained with respect to stability, in the sense that no externally supplied control signals are needed for controlling the direction of transmission. Instead, the transmission capability of the repeater is controlled internally by the data signals themselves as they arrive from one or other of the bus-line sections. The problem of externally generating special control signals is thereby completely eliminated.

The patent literature known to applicant includes only one description of a bidirectional repeater that aims to use internally developed control signals for selecting the direction of transmission. U.S. Pat. No. 3,769,525 to Richard C. Foss describes such a system which includes a memory circuit "for remembering which direction data transmission has been established and for ensuring that the logic gate controlling data flow in that direction remains enabled and the logic gate controlling data flow in the opposite direction is disabled until data flow in the originally established direction ceases."

However, the repeater circuits described by Foss, as typified by his FIG. 4, have the disadvantage of requiring eight distinct gates or equivalent circuit units, including the memory circuit and its control gates. Each bus-line section is electrically loaded by one of those control gates, thereby adding to the potential generation of line noise.

Moreover, when the state of the memory circuit initially corresponds to transmission in one direction a data signal input in the other direction must cause successive signal traversals of four gate units with their cumulative time delays before it appears at the output bus-line terminal. Therefore, the delay of signal transmission is different depending upon the previous direction of signal transmission.

The present invention aims to avoid those disadvantages, and to provide circuits which are simpler and more economical than any suggested by the Foss patent. In particular, the present invention, at least in its preferred embodiments, does not require the complexity and time delay associated with use of a memory circuit.

A more particular purpose of the invention is to assure signal transmission in either direction through the amplifying repeater with minimum time delay, and in such a way that whatever time delay may be experienced is strictly uniform for successive signal pulses.

A further object of the invention is to provide a repeater circuit having optimum time discrimination between oppositely directed input signals which appear at the two input terminals nearly simultaneously. Especially in systems in which the leading edge of each signal pulse carries the data information, it is important to avoid significant delay or irregularity in selecting which of two competing signals should be transmitted.

A still further object of the invention is to avoid unnecessary electrical loading of the bus-line sections by the switching logic, which might cause noise on those lines and thus lower the effective signal to noise ratio of the overall system.

The invention further aims to provide self-contained bidirectional repeater circuits having good flexibility of design with respect to the type of logic gates required for their instrumentation, so that optimum economy and convenience of fabrication can be attained under varying system requirements.

Previously available bidirectional line repeaters of the described general type ordinarily may incorporate switching means for selectively disabling signal transmission in one or both directions in response to an external control circuit to make the repeater effectively a unidirectional or open circuit between the two line sections which it normally connects. That is true also of the repeaters of the present invention, which also may employ a novel manner of applying the disabling signal.

BRIEF DESCRIPTION OF THE INVENTION

As in conventional line repeaters, the present invention typically employs distinct transmission circuits for the respective directions, connected in opposed parallel relation between the two repeater terminals. Each transmission circuit comprises an input amplifying unit, commonly referred to as the receiver, connected in series with an output amplifying unit, commonly referred to as the driver. One or both of those amplifying units may include a logic gate with at least one control input terminal in addition to the signal input terminal. The two amplifying units also typically provide in known manner whatever pulse shaping capability is desired for restoring the proper waveforms of signal pulses. The amplifying units of each transmission circuit are connected in series by connective circuit means which may include additional signal processing circuitry as desired, or may comprise simply a conductive line, or even a single terminal which acts both as output terminal for the receiver and as input terminal for the driver. That connective circuit means will be referred to for convenience simply as the connector.

An important aspect of the invention is the concept of maintaining the repeater normally in condition to transmit an incoming pulse in either direction. That is, during idle periods when no transmission is taking place, the repeater has the capability of promptly transmitting a data pulse arriving at either terminal. Hence the only time delay experienced by a transmitted data pulse is normally that imposed by the active transmission circuit itself; no additional delay is imposed by any switching operation for enabling that transmission circuit.

A further aspect of the invention provides control of the direction of transmission by means of logic control circuitry which is responsive solely to the logic states of the connectors of the two transmission circuits. Accordingly, that logic circuitry is not required to impose any electrical load on either of the repeater terminals.

The invention provides logic control circuitry which acts in response to idle condition of both transmission circuits to enable both those circuits. When a data pulse arrives at the connector of either one of the transmission circuits, the logic control circuitry derives a control signal from the change of state of the active connector, and applies that signal to maintain the active transmission circuit in enabled condition and to disable the other transmission circuit. That disabling action then continues under direct control of the data pulse being transmitted. The disabled transmission circuit then cannot prevent pulse termination. At the end of the data pulse the control signal also ends, and the repeater circuit returns to its normal idle condition with both transmission circuits again enabled for prompt transmission of the next data pulse, regardless of the direction in which that pulse may arrive.

A further aspect of the invention prevents spurious signals at both the leading and trailing edges of a data pulse by causing the control signal to act with different effective time delays at the two edges; or a single time delay may be selected to protect the more important edge.

In one form of the invention, the control signal derived from the active transmission circuit disables the other transmission circuit by disabling the driver of that circuit. It is then necessary, for reasons which will appear more fully later, to disable also the corresponding control action for the opposite direction of data signal transmission. That may be accomplished, for example, by inserting a suitable logic gate in the control signal line for each direction of transmission, and by providing circuitry for disabling each such gate in response to presence of a control signal at the output of the corresponding gate for the opposite direction of transmission.

That form of repeater typically requires only six circuit units in apparatus employing negative logic, for example, such a repeater may comprise two inverters used as receivers in the respective transmission circuits, two NAND gates used as drivers, each with its control input terminal connected to the connector of the other transmission circuit, and two NAND gates for selectively disabling those control signal connections.

In another form of the invention, the control signal derived from the active transmission circuit disables the other transmission circuit by disabling the receiver of that circuit, either directly or effectively. An advantage of that configuration is that no further logic units are required, and the repeater may comprise only four units, for example two NOR gates employed as receivers and two inverters used as drivers.

As will be evident to those skilled in the art, those two illustrative forms of the invention may be extended and modified in many respects, including the substitution of well known logic equivalents, introduction of signal inverters, modification of the circuit position at which inversion is performed, and suitable modifications to adapt the principles of operation to signals of different polarity, or the like.

In particular, the circuits of the invention are adaptable in a wide variety of detailed ways to incorporate the function of line switching, that is, the capability for selectively disabling data transmission in one or both directions under control of an external switching signal, whereby the repeaters of the invention are enabled to act also as bidirectional switches. Unless otherwise stated or implied by the context, the term "repeater" and the like are intended to include devices having that switching capability.

BRIEF DESCRIPTION OF THE DRAWING

A full understanding of the invention, and of its further objects and advantages, will be had from the following detailed description of illustrative manners of carrying it out. The particulars of that description, and of the accompanying drawings which form a part of it, are intended only as illustration of the invention, and not as a limitation upon its scope, which is defined in the appended claims.

In the drawings.

DESCRIPTION OF PREFERRED EMBODIMENTS OF THE INVENTION

For the sake of clarity, the invention will be described primarily as it applies to equipment using negative logic, wherein information is conveyed by pulses of voltage lower than the selected zero voltage, and wherein the pulse time is taken as the time of the leading edge of the pulse rather than its trailing edge.

Figure 1:
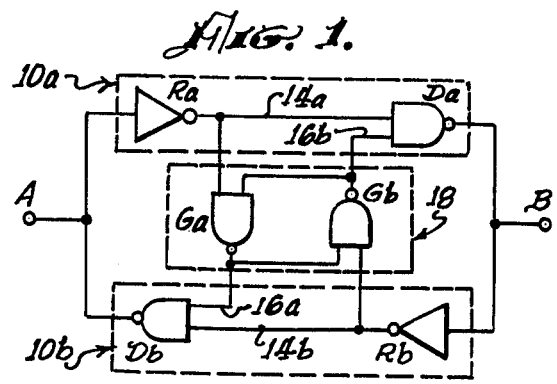
FIG. 1 is a schematic diagram representing an illustrative line embodying one form of the invention.

The embodiment of the invention shown schematically in FIG. 1 comprises the two transmission circuits 10a and 10b for transmitting input data signals from terminal A to terminal B and from terminal B to terminal A, respectively. Each transmission circuit is made up of a receiver amplifier R and a driver amplifier D, the amplifying units of the respective circuits being distinguished by addition of the letter a or b according as the transmitted signal is input at terminal A or B. In the present repeater circuit each of the receivers comprises a simple inverter with input connected to the associated terminal. The driver amplifiers incorporate NAND gates with their signal inputs connected to the outputs of the associated receivers via the direct connections 14a and 14b, which form the "connectors" already mentioned.

The control inputs of the NAND gate drivers Da and Db receive control signals derived from the respective connectors 14b and 14a of the opposite transmission circuits. Those control signals are subject to modification by the logic network 18, comprising the two NAND gates Ga and Gb. Each of those gates conditions delivery of a control signal from the connector of the corresponding transmission circuit to the driver of the other transmission circuit, the conditioning action of each gate being controlled by the output of the other gate. In the present illustrative circuit, control gates Ga and Gb receive input signals directly from the corresponding connectors 14a and 14b. The gate outputs on the lines 16a and 16b are connected to the inputs of the respective NAND gate drivers Db and Da. Each gate output is also connected to the control input of the other gate.

Operation of the present illustrative repeaters will be described for the typical case that the transmission line sections connected to terminals A and B are normally maintained at the selected high potential by conventional resistive biasing means, and that the negative-going signal pulses to be transmitted override that bias. Each of the amplifying and gating units of the repeater system is typically so designed that when its output is Low the output terminal is driven Low; but when the output is High the output terminal is merely biased High, and can be overridden by the Low output of another unit with common output terminal.

Under normal or idle conditions of the system, with no data signal present on either line section, terminals A and B are both High. The inverting action of receivers Ra abd Rb then hold lines 14a and 14b Low. The outputs of both NAND gate drivers Da and Db are therefore High, and the outputs of both gates Ga and Gb are also High, regardless of the logic states of their control inputs from lines 16b and 16a, respectively. The High driver outputs confirm the already High states of the respective terminals B and A; and the High gate outputs enable the respective drivers Db and Da in the sense that a change of signal input will promptly produce a corresponding change of output. The respective gates Gb and Ga are similarly enabled.

When a Low data pulse arrives at terminal A, say, it is promptly transmitted by inverting receiver Ra, appearing as a High signal on connector line 14a. Since NAND gate driver Da is already enabled, as just explained, that data signal is promptly transmitted, driving terminal B Low. The incoming data signal at A is thus transmitted by the repeater to B with only the minimal time delay imposed by the two amplifying and waveform-restoring units Ra and Da.

The High data signal on connector 14a is similarly transmitted promptly via control gate Ga, appearing on line 16a as a Low control signal which disables both NAND gate driver Db and control gate Gb of the opposite transmission circuit 10b. Hence, by the time the Low data signal at terminal B is recirculated via receiver Rb and appears on connector 14b as a High signal, it can neither pass driver Db to produce a possibly spurious Low at A nor pass gate Gb to interrupt direct transmission of the data signal by disabling driver Da.

That active condition of circuit 10a persists until termination of the Low data signal at terminal A restores connector 14a to its normal Low logic state. That returns the entire system to its described idle condition, ready to receive and transmit another data pulse. Whether the next pulse arrives at terminal A or B, it is transmitted promptly. The above description of circuit operation applies to signal transmission from B to A by suitable interchange of letters. Thus, each successive pulse of a string is treated identically, accurately preserving the time relation between them.

In accordance with a further aspect of the invention, functions equivalent to those described in connection with FIG. 1 can be provided in basic substance by even simpler circuitry. In the repeater circuit shown illustratively in FIG. 2, all six units comprise inverters, typically having the property already described that a Low output is positively driven, while a High output is only biased. Two of those units serve as receivers Ra and Rb in the respective transmission circuits 20a and 20b, two serve as drivers Da and Db in those circuits, and the remaining two units Ca and Cb are series connected in two oppositely directed control circuits between the connectors 24a and 24b of the respective transmission circuits.

Figure 2:
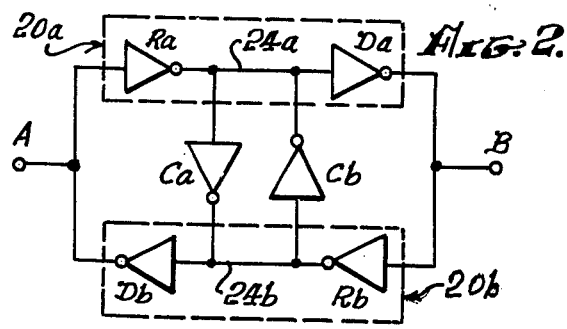
FIG. 2 is a schematic diagram representing a further embodiment of the invention.

In idle condition of the system of FIG. 2, with terminals A and B both High, connectors 24a and 24b are both driven Low. The resulting High outputs of control inverters Ca and Cb are overridden by the Low receiver outputs during idle condition. However, they enable the connectors to go High in absence of those Low receiver outputs, and can thus be considered to constitute enabling control signals for the respective transmission circuits.

Upon appearance of a Low data signal at terminal A, say, connector 24a promptly becomes High, causing a Low output data signal to be delivered at terminal B. The High on connector 24a also causes control inverter Ca to drive connector 24b Low, effectively disabling transmission circuit 20b. Recirculation of the Low data signal from terminal B is thereby prevented, allowing terminal A to become High at the end of the data signal.

That disabling action by the Low control signal from inverter Ca may be viewed as effectively disabling driver Db, since the input signal to the latter is held Low. In the same sense, that same Low control signal effectively disables the oppositely directed control inverter Cb from performing its normal function, which is to respond to data signal transmission from B to A by driving connector 24a Low to disable transmission circuit 20a. Thus, inverter Ca performs functions closely similar to those of NAND gate Ga of FIG. 1, already described.

On the other hand, the control action of the Low output from inverter Ca may be viewed alternatively as disabling transmission circuit 20b by disabling its receiver Rb, since the output line from that receiver is held Low and is thus made independent of the receiver input. From that viewpoint, the effective disabling of driver Db and of control inverter Cb may be considered as an inherent consequence of the disabling of receiver Rb.

Figure 3:
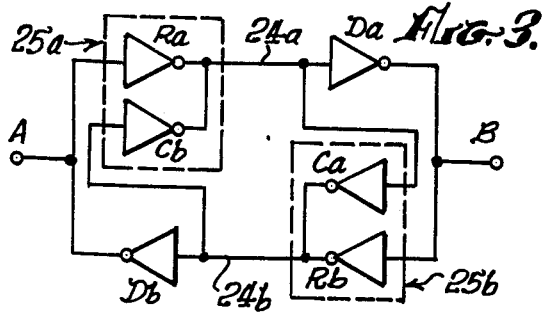
FIG. 3 is a schematic diagram corresponding to FIG. 2 and illustrating a particular aspect of its operation.

The system of FIG. 2 is redrawn in FIG. 3 with the two control inverters Ca and Cb interchanged in position and re-oriented to illustrate the viewpoint just described. The suggested close association of control gate Ca with receiver Rb and of gate Cb with receiver Ra is emphasized by grouping those element pairs at 25a and 25b. The two inverters of each pair will be seen to perform the joint function of driving their common output Low when either of their inputs is High, and of biasing that output High only if both inputs are Low. The action is thus equivalent to that of a NOR gate, suggesting a further manner of implementing the present invention.

Figure 4:
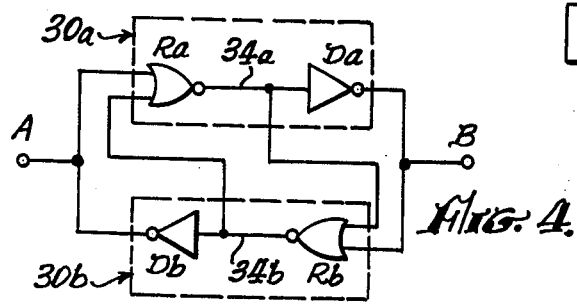
FIG. 4 is a schematic diagram representing a further embodiment of the invention.

FIG. 4 illustrates such a modified implementation. Each of the transmission circuits 30a and 30b comprises a NOR gate as receiver and an inverter as driver. Each NOR gate typically receives a control signal directly from the connector of the opposite transmission circuit. In idle condition of the system, both NOR gate receivers are enabled.

In operation of the circuit of FIG. 4, transmission of a Low data signal arriving at terminal A shifts connector 34a to High, causing driver Da to drive output terminal B Low. The High signal on connector 34a also disables NOR gate receiver Rb of the idle transmission circuit 30b, causing the output of that receiver to remain Low independently of the condition of its signal input from B. Receiver Ra therefore continues responsive to the input from A, returning the system to idle condition at the end of each data pulse.

Definition of Trailing Edge of Pulse

As already pointed out, the invention typically preserves precisely the relative timing of the leading edges of successive data pulses, imposing on each only the slight time delay due to normal signal transmission by the receiver and driver amplifying units. If tht unit delay is assumed to be the same for all units and is designated dt, the leading edge delay is only 2dt. That rapid and uniform response results from the combination of maintaining both transmission circuits normally in enabled condition, and promptly disabling the idle transmission circuit in response to presence of a data pulse in the other transmission circuit. The idle transmission circuit is again enabled in response to the trailing edge of the data pulse, and that enabling action tends to be as prompt as was the disabling action at the pulse leading edge. Under some conditions of time delay and frequency response it is possible that the idle transmission circuit may become re-enabled in time to impair definition of the trailing edge of the transmitted data pulse.

More specifically, at termination of a data pulse at terminal A of FIG. 1, say, after connector 14a has returned to its normal Low state, gate Ga requires only about one unit delay time dt to re-enable driver Db. Connector 14b is then typically still High, but will be returned to its normal Low state after another time interval dt by recirculation of the pulse trailing edge from terminal B. The coincidence of enabled driver Db and High connector 14b can produce a Low at terminal A. However, that spurious signal is at most a sharp spike, and can affect output terminal B only if the transmission circuit has high frequency response. Even then, the resulting reduced definition of the transmitted trailing edge is of practical importance only in systems in which timing of a data pulse is determined by the trailing edge.

Such possible degrading of the trailing edge of a data pulse can be eliminated, according to a further aspect of the invention, by providing circuit means for slightly delaying termination of the control signal that disables the idle transmission circuit. A preferred manner of obtaining such delay is to provide two parallel paths for the disabling signal. One path is direct, acting promptly as already described, and dominating initiation of the disabling action. The other signal path includes time delay means of any suitable type, causing an offset of the transmitted control signal toward later times. The idle transmission circuit is thereby disabled during the total time that either of the disabling signals is received, combining prompt action at the leading edge and delayed action at the trailing edge of the data pulse. A convenient form of time delay circuit for that purpose comprises a pair of inverters connected in series and producing a delay of approximately 2dt, which is an ideal value for many circuits. However, delay times from as little as dt to about 5dt or even more may be useful under some conditions.

Figure 5:
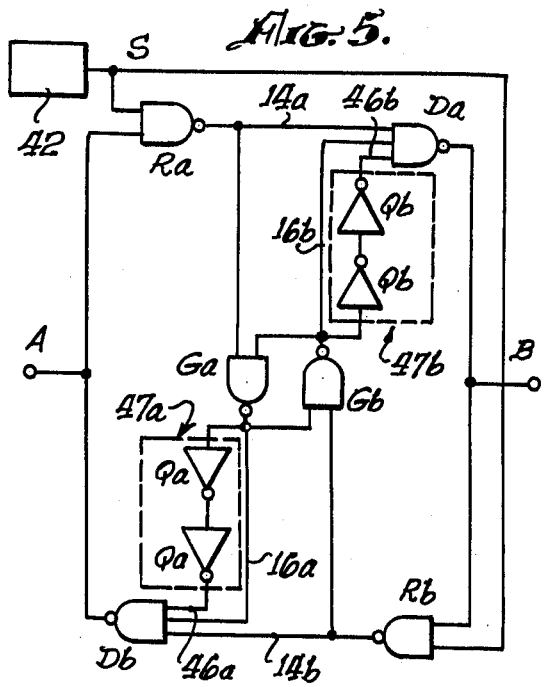
FIG. 5 is a schematic diagram corresponding generally to FIG. 1 and illustrating adaptability of the repeater as a line switch and modification of the circuit to insure correct transmission of the trailing edge of a signal pulse.

FIG. 5 shows a repeater similar to that of FIG. 1 and operating generally in the same manner, but including delay circuits of the type just described for inhibiting spurious signals at trailing edges of the transmitted data pulses. As illustratively shown, each of the NAND gate drivers Db and Da is provided with an additional control input from the lines 46a and 46b. The control signals for those inputs are supplied from the outputs of control gates Ga and Gb via the respective time delay circuits 47a and 47b, which comprise the pairs of inverters Qa and Qb. Those delay circuits act in parallel with the direct signal paths 16a and 16b.

A Low data pulse arriving at a terminal A, say, is promptly transmitted as a High signal to connector 14a and causes the output from control gate Ga to be driven Low. That Low signal on line 16a immediately disables NAND gate driver Db of the opposite transmission circuit. The Low signal from line 16a is also supplied via the delay circuit 47a to the second control input 46a, but is ineffective since the gate is already cut off.

At termination of the data pulse at terminal A, connector 14a is driven Low and the output from gate Ga becomes High. Immediate supply of that High signal via line 16a to NAND gate driver Db does not enable the gate, since its second control input 46a remains Low. When the delayed control signal arrives on line 46a and enables the gate, it is ineffective because connector 14b is already Low due to normal recirculation of the pulse end from terminal B. Hence no spurious signal passes NAND gate driver Db.

The circuit of FIG. 4 may be modified in corresponding manner by providing an additional control input on each of the NOR gate receivers Ra and Rb, and supplying those inputs with control signals via suitable delay circuits from the opposite connectors 34b and 34a, respectively. Those delay circuits may each comprises a pair of inverters, for example, as at 47a and 47b of FIG. 5. They act effectively in parallel with the respective direct control lines shown in FIG. 4. At the trailing edge of a data pulse from terminal A, say, receiver Rb then continues to receive a High control input until terminal B goes High. Connector 34b is thus held continuously in its normal idle Low state.

Figure 6:
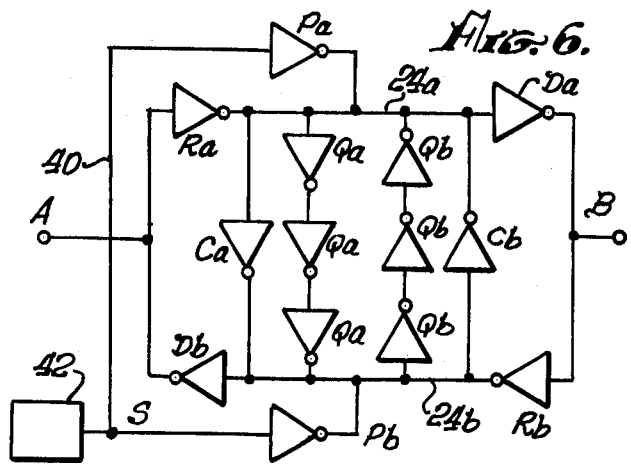
FIG. 6 is a schematic diagram corresponding generally to FIG. 2 and illustrating modifications corresponding to those of FIG. 5.

FIG. 6 illustrates a typical embodiment of the present aspect of the invention in a repeater circuit similar to that of FIG. 2. In that circuit recirculation of a data pulse is prevented by a disabling signal delivered via the control inverter Ca or Cb directly from one connector to the other. Under that condition the delayed disabling signal is typically supplied via a string of three inverters connected in series, as indicated at Qa and Qb. One of those three inverters may be considered as performing the function of Ca or Cb, while the other two produce the desired 2dt delay.

When a Low data pulse appears at terminal A, say, the resulting High signal on connector 24a causes control inverter Ca to drive connector 24b Low, preventing recirculation of the pulse. At the pulse end, the three inverters Qa continue to drive connector 24b Low until after it has been returned to its normal Low idle state via receiver Rb.

It should be noted that the described delay in switching off the disabling control signal affects only the idle transmission circuit, and does not alter normal transmission of the pulse termination. However, it is preferred to limit that delay to substantially the minimum required for the described purpose. In that way it is possible to retain the desirable property of the repeaters of the invention, namely, that after transmission of each data pulse the system is restored virtually immediately to its normal idle condition, ready to transmit promptly a further pulse arriving at either terminal.

In many actual systems a slight simplification of circuits such as FIGS. 5 and 6 can be obtained by supplying the control signal only via the circuit that includes the described delay, omitting entirely the undelayed signal supply. That is, in FIG. 5 the lines 16a and 16b may then be omitted and the control signals supplied to NAND gate drivers Da and Db only via the delay circuits 47a and 47b. Such omission does not affect the flow of primary signals in the circuit, since the resulting momentary recirculation of the leading edge of a data pulse appears at the input terminal as a Low spike, merely confirming the entering signal. Long before the end of the data pulse, that spike has been replaced by the normal High output of the idle transmission circuit, which does not override the Low data pulse and does not inhibit return of the terminal to its normal High condition at the end of the data pulse.

Figure 7:
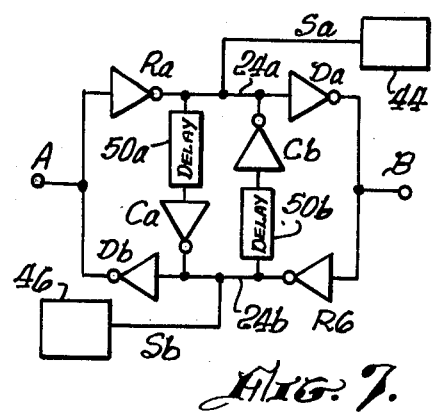
FIG. 7 is a schematic diagram corresponding generally to FIG. 6 and illustrating dual control of line switching and modified trailing edge control.

FIG. 7 illustrates such modification of FIG. 6, with the control circuits each represented as an inverter in series with a delay circuit. The inverters are denoted Ca and Cb as in FIG. 2. The delay circuits are represented only schematically at 50a and 50b, emphasizing that they may be of any suitable type.

Figure 8:
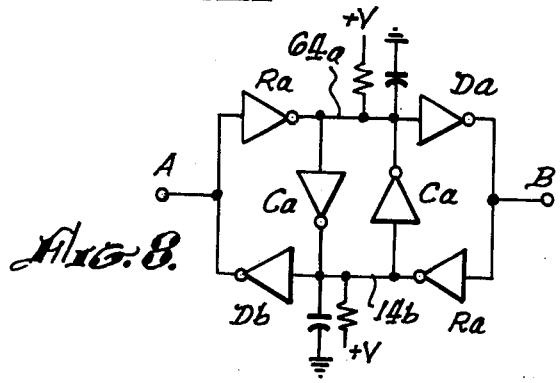
FIG. 8 is a schematic diagram illustrating further modified trailing edge control.

FIG. 8 represents a further modification, in which the delay is produced by a resistance-capacitance circuit associated with each of the connectors 64a and 64b. Each circuit typically comprises a resistance connected to a source of positive potential and a capacitance connected to a constant voltage source shown as ground. Those circuits may be considered to represent conventional low pass filters of any desired type which slow very slightly the imposition of any step function on the connector. Such circuits may be provided explicitly, as indicated, or may result from stray effects inherent in the system.

Bus-Line Switching

The line repeaters of the invention are readily adaptable to incorporate switching control such that data transmission in one or both directions between line sections may be selectively cut off in response to an externally developed switching signal. Such switching may be provided in each case by a variety of circuit configurations.

For example, a repeater with such switching capability may be derived from any of the illustrative repeater circuits of FIGS. 1 to 4 by replacing any pair of the simple inverters in the respective transmission circuits by NOR gates or by NAND gates, according as it is desired to disable the repeater by a High or by a Low switching control signal. FIG. 5 represents such a modification of FIG. 1 in which the inverters Ra and Rb have been replaced by NAND gates. The control inputs of those gates are supplied in parallel with a common control signal S, obtained via the line 40 from any suitable source, represented schematically at 42. With S High, the NAND gates are enabled and the system operates as already described in connection with FIG. 1. With S Low, the NAND gates are cut off and connectors 14a and 14b remain High regardless of input data signals at terminal A or B. The repeater thus acts as an open circuit as far as signal transmission is concerned. Aside from delay circuits 47a and 47b, this circuit consists entirely of NAND gates, tending to simplify its fabrication by conventional integrated circuit techniques.

If the switching signal S is applied via NOR gates at Ra and Rb, instead of the NAND gates of FIG. 5, the action is the same except that normal repeater action is obtained with S Low, and is inhibited with S High.

Switching action is obtainable similarly in the repeater of FIG. 2, for example, by substituting gates for either the pair of inverters Ra and Rb or the pair of inverters Da and Db, and in the system of FIG. 4 by substituting gates for the inverters Da and Db.

As a further example, switching action may be obtained by providing an additional control input on each of a pair of transmission gates, such as the pair of NAND gate drivers Da and Db of FIG. 1 or the pair of NOR gate receivers of FIG. 4. Supply of a switching signal S of suitable logic state to those additional gate inputs produces corresponding switching action.

FIG. 6 illustrates a preferred manner of obtaining switching action in a repeater of the general type represented in FIG. 2, while retaining the desirable property that all amplifying units are simple inverters. That is accomplished by applying the switching control directly to the connectors 24a and 24b of the respective transmission circuits. As typically shown, the switching signal S from any suitable source 42 is supplied via line 40 and the isolating inverters Pa and Pb to the respective connectors 24a and 24b. The inverters in the respective branches of the control line avoid interconnection between the two transmission circuits. With S Low, a High signal is thus applied to each connector, but does not affect normal operation of the repeater since it is overridden by a Low signal from a receiver or from a control inverter. With S High, the connectors are both driven Low, disabling the repeater.

Opposite response to S can be obtained by substituting non-inverting isolating elements for Pa and Pb, or by inserting a further inverter in each lead, for example. Similar direct application of switching control to the connectors, as illustratively shown in FIG. 6, is also typically effective with other repeater circuits of the invention.

In any of the described switching circuits or their substantial equivalents, transmission in the two directions can be controlled separately if desired, as by supplying control signals from independent sources or via selective switching means to the respective transmission circuits. FIG. 7 illustrates such separate control from the two independently controllable signal sources 44 and 46. Signal Sa from source 44 provides on/off control of transmission from terminal A to B, while signal Sb from source 46 does the same for transmission from B to A.

The present invention is, of course, equally effective in systems using positive logic as well as with the negative logic that has been assumed above for purposes of illustration. The circuits that have been described may be modified accordingly in any suitable manner. As an example, circuit modification to accommodate positive going data pulses may comprise substituting NAND gates for NOR gates and vice versa, and designing the amplifying and gating elements to drive their outputs when positive, rather than when negative as described.

It will be recognized, further, that any of the logic elements or combinations of elements that have been described may be replaced by different elements, or by combinations of elements, that are functionally equivalent in accordance with de Morgan's rules and the many similar well known relationships among logical operations. It is therefore possible, without departing from the essence of the invention, to design a large number of alternative circuits which are substantially equivalent in function to those described above, and which provide some or all of the potential advantages of the present invention.

I claim:

1. In repeater apparatus for bidirectional transmission of binary data signals between first and second terminals adapted for connection to respective busline sections and the like, which apparatus includes first and second transmission means connected in opposed parallel relation between the terminals for transmitting data signals in the respective directions; each transmission means including an amplifying and inverting receiver, an amplifying and inverting driver logic gate having a signal input and a control input, and connector means connecting the output of the receiver to the signal input of the driver and having an active logic state during data signal transmission therein and having an idle logic state in absence of data signal transmission therein; the improvement comprising a control circuit connected between the connector means of each transmission means and the control input of the driver gate of the other transmission means for continuously supplying to the driver gate control input a gate enabling control signal in response to idle logic state of the connector means, each said control circuit normally supplying to the driver gate control input a gate disabling control signal in response to active logic state of the connector means, and logic means responsive to such supply of a disabling control signal by one of said control circuits for preventing such supply of a disabling control signal by the other control circuit.

2. Repeater apparatus according to claim 1 wherein each said control circuit includes a control gate having a signal input connected to the associated connector means, having an output connected to the control input of the associated driver gate, and having a control input, the control input of each control gate being connected to the output of the other control gate.

3. Repeater apparatus according to claim 2 wherein each said driver logic gate and each said control gate comprises a NAND gate.

4. Repeater apparatus according to claim 2 wherein each of said driver gates has a second control input, and the output of each said control gate is connected via parallel paths to the respective first and second control inputs of the associated driver gate, and two inverters are connected in series in one of said parallel paths.

5. In repeater apparatus for bidirectional transmission of binary data signals between first and second terminals adapted for connection to respective busline sections and the like, which apparatus includes first and second transmission means connected in opposed parallel relation between the terminals for transmitting data signals in the respective directions; each transmission means including an amplifying and inverting receiver, an amplifying and inverting driver, and a connector connecting the receiver output to the driver input; each connector having an active logic state during data signal transmission therein and having an idle logic state in absence of data signal transmission therein; the improvement comprising control circuit means connected between each one connector in one transmission means and the other transmission means for delivering a disabling control signal to said other transmission means to positively disable data signal transmission therein in response to active logic state of said one connector, each said control circuit means including two parallel circuit branches for delivering said disabling signal, one of said circuit branches including means for delaying delivery of said disabling control signal for a delay time relative to the other circuit branch between about one and about five times the transmission time of a data pulse trailing edge from a connector to the associated terminal, whereby at initiation of data pulse transmission in said one connector said other transmission means is disabled promptly via said other circuit branch, whereas at termination of such data transmission in said one connector the other transmission means remains disabled via said one circuit branch at least throughout data pulse transmission at said associated terminal.

6. Repeater apparatus for bidirectional transmission of binary data signals between first and second terminals which are adapted for connection to respective bus-line sections and the like, comprising a first pair of amplifying inverters connected in series in one direction between the terminals for transmitting data pulses from the first terminal to the second terminal, a second pair of amplifying inverters connected in series in the other direction between the terminals for transmitting data pulses from the second terminal to the first terminal, a first coupling circuit comprising three inverters connected in series from the junction of said first pair of inverters to the junction of said second pair of inverters, and a second coupling circuit comprising three inverters connected in series from the junction of said second pair of inverters to the junction of said first pair of inverters.

7. Repeater apparatus according to claim 6 wherein each of said coupling circuits includes also a single inverter connected between said junctions in the same direction as said three inverters.

* * * * *